United States Patent
Preisach

(10) Patent No.: US 8,305,111 B2
(45) Date of Patent: Nov. 6, 2012

(54) ELECTRICAL SPACE SWITCHING MATRIX

(75) Inventor: Helmut Preisach, Besigheim (DE)

(73) Assignee: Alcatel Lucent, Paris (FR)

( * ) Notice: Subject to any disclaimer, the term of this patent is extended or adjusted under 35 U.S.C. 154(b) by 1978 days.

(21) Appl. No.: 10/752,597

(22) Filed: Jan. 8, 2004

(65) Prior Publication Data
US 2004/0150008 A1 Aug. 5, 2004

(30) Foreign Application Priority Data
Feb. 5, 2003 (EP) ..................................... 03360014

(51) Int. Cl.
*H03K 19/177* (2006.01)
(52) U.S. Cl. .................. 326/41; 326/38; 326/82
(58) Field of Classification Search .............. 326/37–81, 326/82, 83
See application file for complete search history.

(56) References Cited

U.S. PATENT DOCUMENTS

| | | | | |
|---|---|---|---|---|
| 5,319,261 A * | 6/1994 | Srinivasan et al. | ............ | 326/41 |
| 5,396,126 A * | 3/1995 | Britton et al. | ................. | 326/41 |
| 5,436,576 A * | 7/1995 | Hibdon et al. | ................. | 326/47 |
| 5,825,203 A * | 10/1998 | Kusunoki et al. | .............. | 326/41 |
| 6,362,650 B1 * | 3/2002 | New et al. | ....................... | 326/41 |
| 6,417,690 B1 * | 7/2002 | Ting et al. | ....................... | 326/41 |
| 6,515,509 B1 * | 2/2003 | Baxter | ........................... | 326/39 |
| 6,545,505 B1 * | 4/2003 | Chan et al. | ..................... | 326/41 |
| 6,844,757 B2 * | 1/2005 | Dante | ............................. | 326/41 |

FOREIGN PATENT DOCUMENTS
EP 1 014 625 A2 6/2000
* cited by examiner

*Primary Examiner* — Don Le
(74) *Attorney, Agent, or Firm* — Sughrue Mion, PLLC

(57) ABSTRACT

A matrix chip having N inputs, M outputs and a number of crosspoint switches, preferably N×M crosspoint switches. The crosspoint switches form a switching matrix that connects the inputs and outputs so that any input is randomly connectable to any output. In order to minimize the signal path lengths on the chip, the inputs and outputs are arranged on the matrix chip in the shape of a cross dividing the matrix into four sectors.

19 Claims, 7 Drawing Sheets

ELECTRICAL SPACE SWITCHING MATRIX

The invention is based on a priority application 03360014.9 which is hereby incorporated by reference.

FIELD OF THE INVENTION

The present invention relates to the field of telecommunications and more particularly to an electrical space switching matrix for use in transmission equipment for high bitrate applications.

BACKGROUND OF THE INVENTION

While today's telecommunication transmission networks rely mainly on optical transmission, internal signal processing in the network elements of a transmission network is still electrical in most cases.

The recent definition of the multiplexing principles and bitrates of an Optical Transport Network (ITU-T G.709) introduces a three level hierarchy with bitrates of 2,7 Gbit/s, 10,7 Gbit/s and 43 Gbit/s. Therefore, equipment is required for electrically processing these high bitrate signals. In particular, a need exists for an optical crossconnect for establishing cross-connections in an optical transport network. An optical crossconnect is a type of switch with a huge number of I/O ports allowing to establish semi-permanent connections from any to any of these I/O ports. Internally, most optical crossconnects operate electrically, as all-optical switching still provides a number of drawbacks and envolves certain system limitations. An optical crossconnect, internally operating electrically, has thus to switch a number of asynchronous electrical signals at different bitrates from any input to any output port. This requires large scale integrated electrical switching matrices for switching high bitrate electrical signals in space between the I/O ports.

For an integrated citrcuit, however, the signal loss per millimeter transmission line length is much larger in silicon than for example in a PTFE printed circuit board or a ceramic chip package. This is particularly true for signals at high bitrate of 10 Gbit/s or more. It is therefore mandatory, to keep the signal paths on the chips as short as possible. As a general rule, amplitude regeneration is necessary after each 2 mm signal path length on a chip. This requirement limits the maximum chip size, since each buffer amplifier adds some jitter to the output signal. On the other hand, it is preferable to have as many inputs and outputs on a single chip as possible. Obviously, this latter aim leads to larger chips the higher the number of inputs and outputs. In particular, the number of crosspoints and thus the chip size scales quadratic with the number of inputs and outputs.

It is therefore an object of the present invention to provide an integrated electrical switching matrix for high bitrate applications of 10 Gbit/s or more with increased number of inputs and outputs.

SUMMARY OF THE INVENTION

These and other objects that appear below are achieved by an integrated electrical switching matrix according to claim 1.

In particular, the matrix chip has a N inputs, M outputs, and a number of crosspoint switches, preferably N×M crosspoint switches. The crosspoint switches form a switching matrix (i.e., the matrix core), which is preferably a square matrix and which connects the inputs and outputs in a manner that any input is randomly connectable to any output. According to the invention, the inputs and outputs are arranged on the matrix chip in the shape of a cross dividing said matrix into four sectors, preferably into quadrants.

Compared to conventional wire-bonded design, where all inputs and outputs are at the periphery of the chip, the chip design according to the invention has the advantage that any broadband data signal has to pass only through one quarter of the core matrix, which reduces power consumption by about 50% and even more in the case of several cascaded chips.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
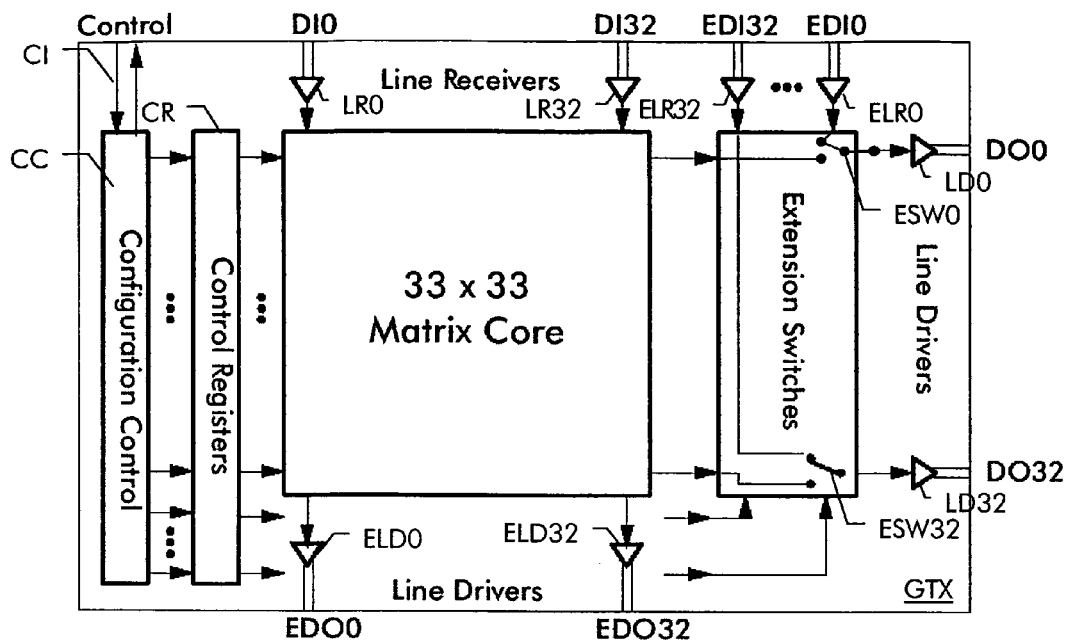
FIG. 1 shows a block diagram of the integrated switching matrix.

A preferred embodiment of the integrated switching matrix is shown as a block diagram in FIG. 1. In particular, the preferred embodiment is a fully transparent, non-blocking crossbar switch with extension capabilities as will be described below. The entire switching matrix is integrated on a single chip GTX. It has 33 data inputs DI0-DI32, 33 data outputs DO0-DO32 and a randomly configurable matrix core MC with a capacity of 33×33 crosspoints connecting the data inputs to the data outputs. The data outputs are each driven by corresponding line drivers LD0-LD32 and data inputs each connect to corresponding line receivers LR0-LR32.

The matrix chip may serve as a 32×32 switching matrix while the 33th input and output may be used for test purposes.

In order to enable cascading of several matrix chips GTX to form a higher capacity compound switching matrix, the matrix chip has further 33 extension data outputs EDO0-EDO32 and 33 extension data inputs EDI0-EDI32. Each regular input is assigned one extension output and each regular output is assigned one extension input. Extension outputs are coupled to their corresponding inputs via buffer amplifiers (not shown) and extension inputs are connected to their corresponding data outputs using extension switches ESW0-ESW32. Like the ordinary data inputs and outputs, the extension inputs connect to line receivers ELR0-ELR32 and the extension outputs are driven by line drivers ELD0-ELD32, respectively.

The line receivers comprise on-chip regulated line termination resistors. The line drivers are CML (current mode logic) output buffers, designed to drive 50Ω lines. The receivers further comprise an active voltage level control using a low-power CMOS operational amplifier. Keeping the receivers' output levels on their nominal values within very small tolerances allows to reduce the worst-case output power consumption considerably.

The matrix chip further contains a control interface CI connected to a configuration controller CC in turn connected to control registers CR and to the control leads of the individual crosspoint switches of the core matrix. However, control interface, configuration controller and control registers are of usual design and those skilled in the art of chip design will know how to implement these. Yet, these components are part of and necessary for proper functioning of the matrix chip, as the invention does not particularly relate to these control components, they will not be described in more details in the following.

The invention recognizes that an important aspect in chip design is to design the chip in a way that the signals paths on and though the chip are as short as possible, as this reduces the need for on-chip amplitude regeneration, which again reduces power consumption and signal distortion (jitter). A basic idea of the present invention is to locate the inputs and outputs in the shape of a cross on the chip. The cross divides the chip surface and thus the core matrix into four sectors. If the cross is perpendicular to the edges of the chip as in the preferred embodiment, these sectors are quadrants.

Figure 2:
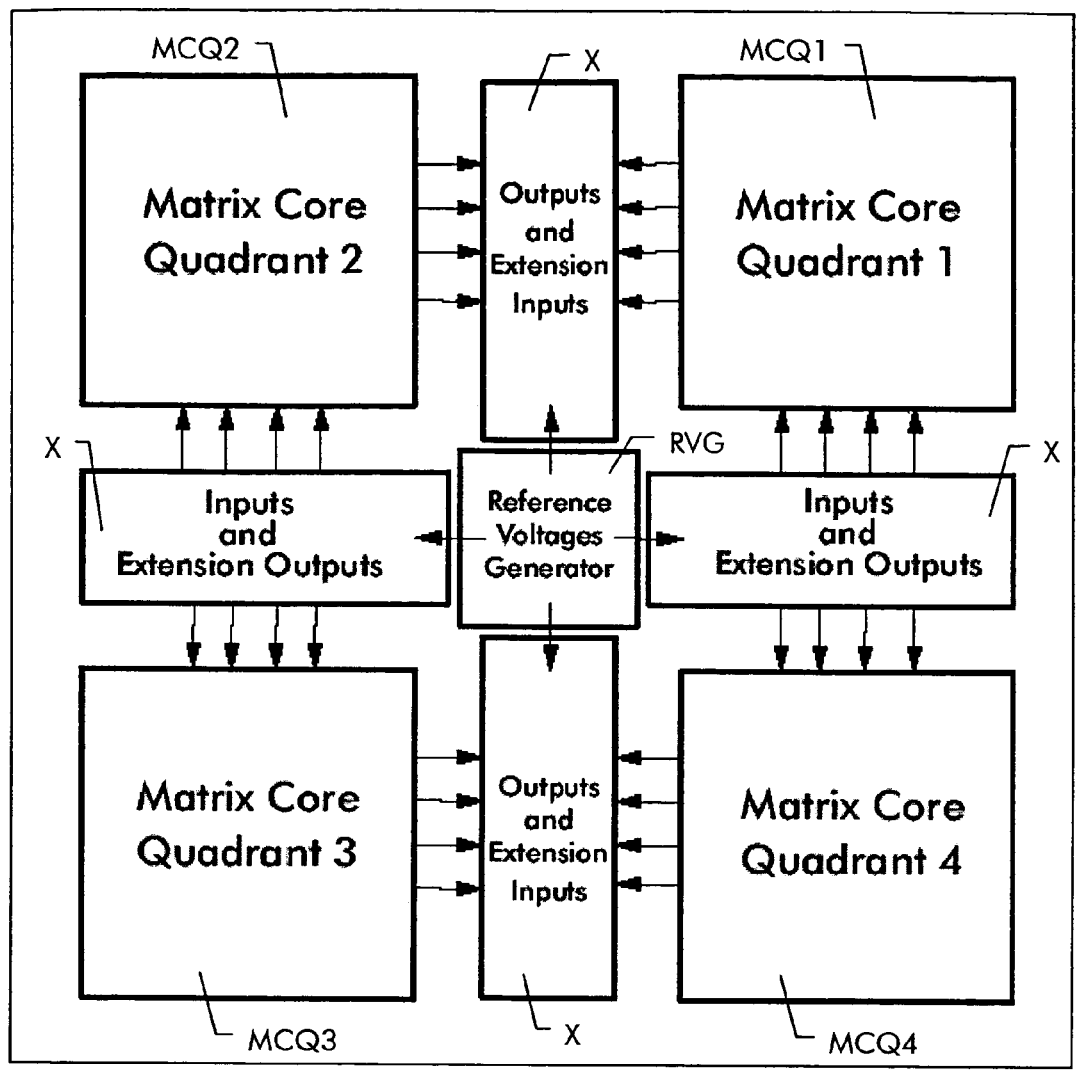
FIG. 2 shows the schematic design of the matrix chip.

FIG. 2 shows the design of the matrix chip schematically. The inputs and outputs are arranged in the form of a cross X. The matrix core is subdivided by the cross into four quadrants, MCQ1-MCQ4. Each quadrant is an asynchronous space switching matrix enclosed by two branches of the cross. Thus, any output can be connected to any input via only one quadrant. In any ordinary configuration, the signal path through one quadrant is thus the maximum distance a data signal has to pass through the chip.

In particular, the inputs and the corresponding extension outputs are arranged in a vertical row that forms one line of the cross and the outputs and extension inputs are arranged in a second row perpendicular (or at least substantially perpendicular) to the first row. The second row forms the second line of the cross. The inputs and the outputs are joint together into perpendicular branches of the cross so that inputs and outputs are not put too close together. This is a precautionary measure to reduce crosstalk from inputs to outputs.

The inner center of the cross is not occupied by any input or output circuits as these obviously would not have access to the matrix. Therefore, in a preferred embodiment, the center of the cross is used for additional functions, such as for reference voltage generators in the preferred embodiment.

As the input and output ports are not arranged at the edge of the chip, it is not suited for classical wire-bonding. Therefore, flip-chip bonding is used to mount the matrix chip on a ceramic carrier for packaging.

Figure 3:
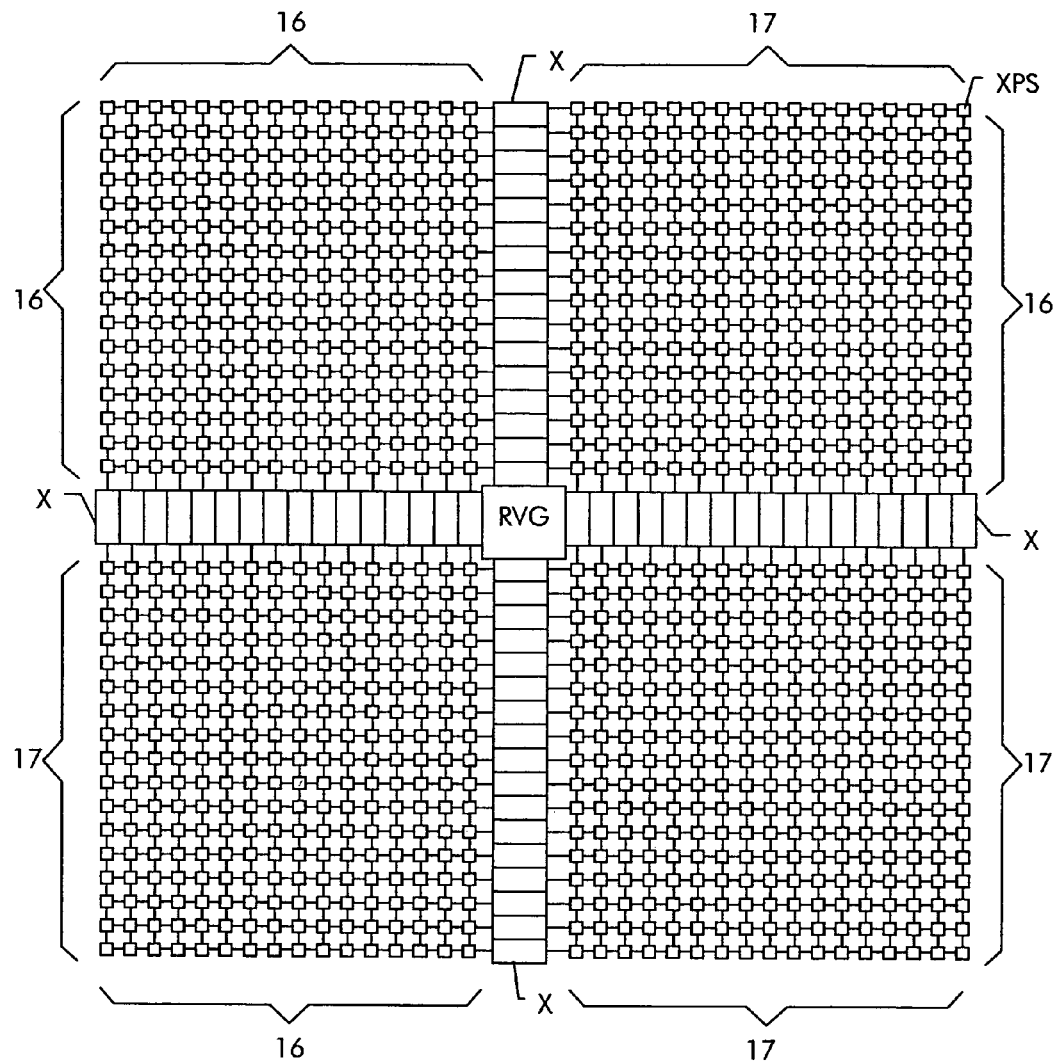
FIG. 3 shows the chip design in more details.

FIG. 3 shows the topology of the switching matrix in greater detail. The matrix consists of a number of individual crosspoint switches XPS arranged to a square matrix with a capacity of 33 inputs and 33 outputs. In total, the matrix thus contains 33×33=1089 individual crosspoint switches. Crosspoint switches in a vertical column are connected to the input in that column and crosspoint switches in a horizontal row are connected to the output in that row. Each crosspoint switch is designed to switch an input signal from the input in its vertical column to the output in its horizontal row. This means that only one crosspoint switch is active to switch an individual input signal to an output. All other crosspoint switches in the same vertical column and horizontal row of the corresponding quadrant are deactivated.

The individual crosspoint switches are preferably of the type described in co-pending European patent application entitled "Basic Switching Circuit" by the same inventor and filed the same day as the present invention, which contents is incorporated by reference herein. The basic switching circuit described therein combines CMOS and bipolar technique on SiGe basis and operates at a low operating voltage of only slightly more than 2V. To achieve this low operating voltage, switching operation of the circuit is effected by switching a constant current source of the switching circuit on or off using MOS transistors. In addition, the constant current source is implemented using a MOS transistor rather than a bipolar transistor, which basically acts as a controllable resistor. Moreover, the logic levels in the output signal are accurately controlled using a constant current source that is controlled by an operational amplifier and a resistor voltage divider at the output to pull the voltage level down by an amount that corresponds to the logical levels.

Obviously, a 33×33 crossbar switch matrix cannot be divided into quadrants of equal size. As can be seen from FIG. 3, quadrant MCQ1 has the size 17×16, MCQ2 has the size 16×16, MCQ3 has the size 16×17 and quadrant MCQ4 has the size 17×17. This sums up to the total capacity of 33×33.

However, this is still a simplification of the actual switching matrix. In reality, signals are buffered (i.e., amplified) several times within the quadrant, as well as in the input and output circuits. This is necessary because it is not possible for 10 Gbit/s signals to cross the entire chip without several amplitude regenerations. Because of this, the crosspoints are implemented as tri-stable buffers, being dispersed across the quadrant area. Also, outside of the crosspoints, signals are regenerated by additional buffers. These are switched on and off automatically, in order to keep power consumption low.

An advantage of having active crosspoints and buffers is, that the input signals can be connected to several output lines in parallel without degradation, thus allowing multicast (broadcast) operation.

Figure 4:
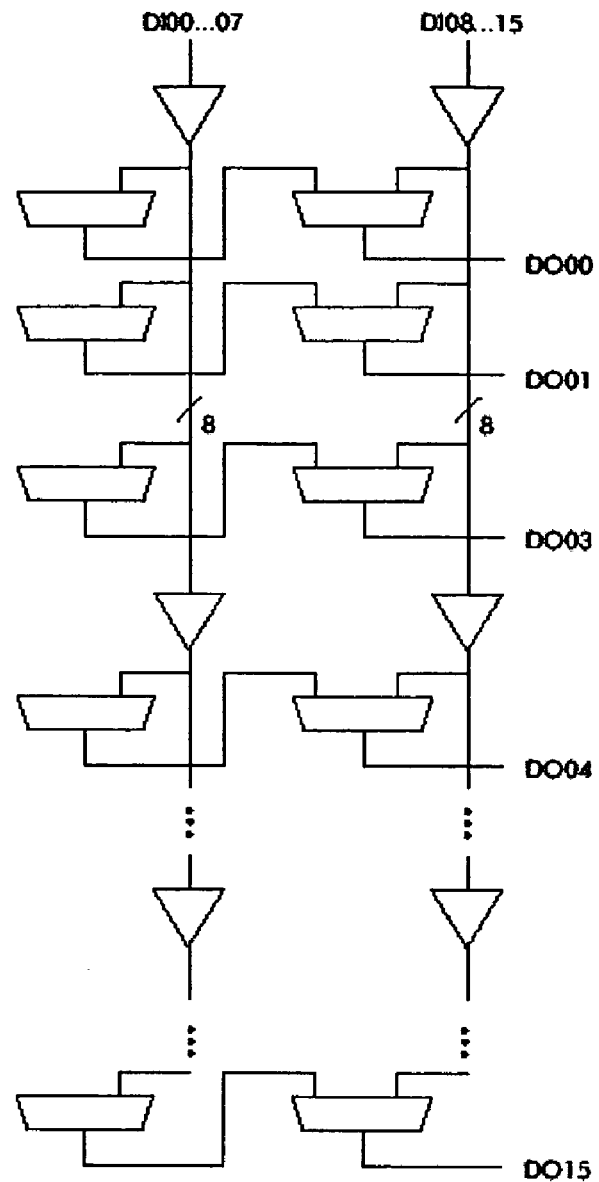
FIG. 4 shows a logical diagram of a switching matrix quadrant.

FIG. 4 shows a logical diagram of a switching matrix quadrant. The buffers are arranged such that logically each output line is composed of a row of cascaded 9:1 multiplexers. Vertical lines are also buffered after each 4 to 5 crosspoints. All multiplexers and buffers are switched off automatically if not needed for operation to reduce power consumption.

Figure 5:
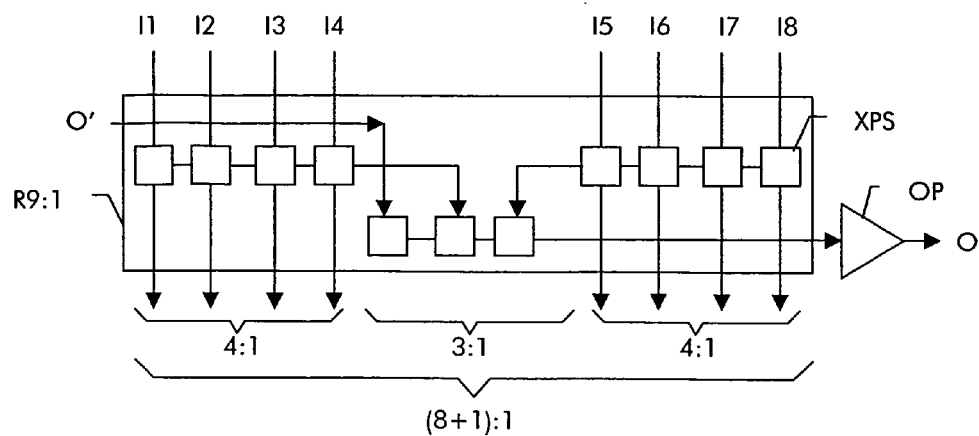
FIG. 5 shows the in more detail a 9:1 multiplexer used in FIG. 4.

FIG. 5 shows the design of the 9:1 multiplexer R9:1 in more detail, which connects 8 inputs DI0-DI7 and an output O' from an adjacent multiplexer to an amplifier OP, which forms the output O of the 9:1 multiplexer. Each square symbolizes a digital cross-point switch XPS. Four cross-point switches corresponding to inputs I1-I4 are connected in parallel, i.e., their outputs are coupled together. This forms a 4:1 multiplexer, i.e., each of the inputs can be connected to the common output. Cross-point switches corresponding to inputs I5-I8 are equally connected in parallel, thus forming a second 4:1 multiplexer. A further 3:1 multiplexer connects the two common outputs of the 4:1 multiplexer and a further signal O' coming from an adjacent 9:1 multiplexer of the same row to the amplifier OP.

Figure 6:
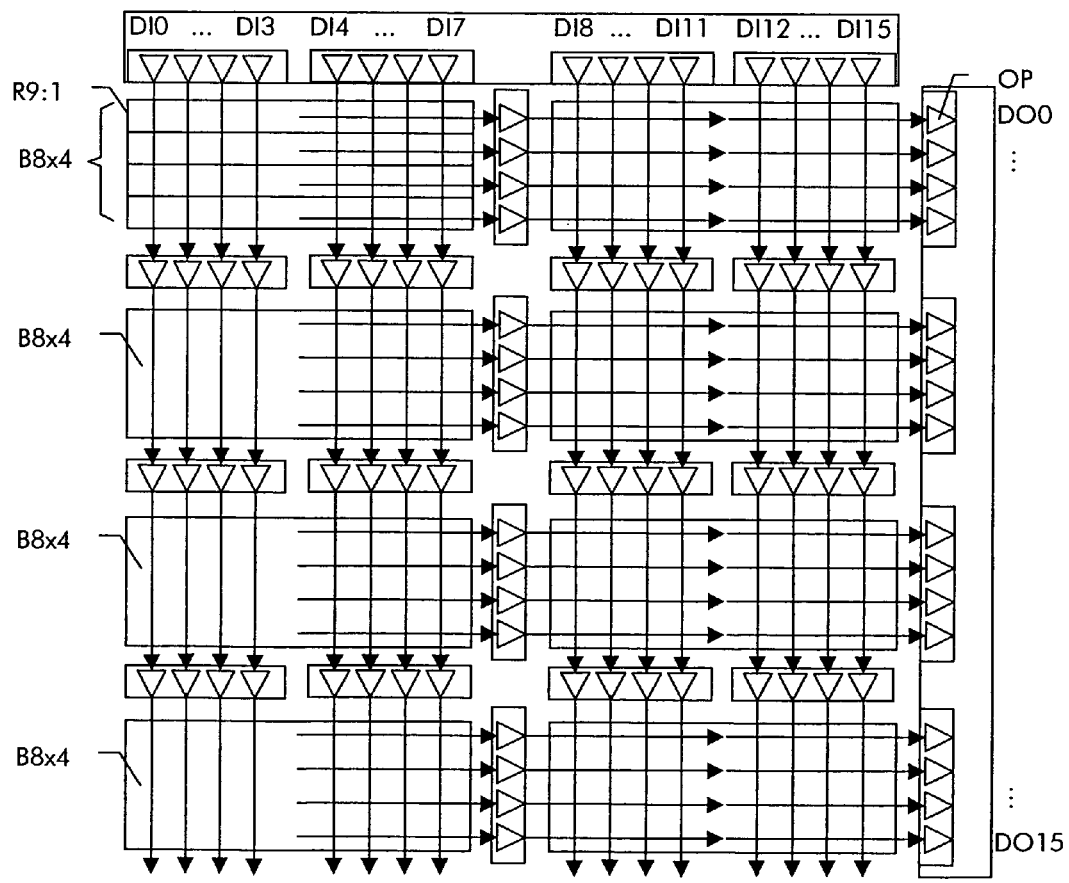
FIG. 6 shows the design of a switching matrix quadrant.

FIG. 6 shows the design of a 16×16 matrix with the basic 9:1 multiplexers from FIG. 5. This 16×16 matrix corresponds to one quadrant of the entire 33×33 switching matrix. The quadrant has 16 inputs DI0 to DI15 and 16 outputs DO0 to DO15. Eight adjacent inputs DI0 to DI7 connect to the vertical inputs of a multiplexer row R9:1, which output is fed via an amplifier OP to the ninth input of a further multiplexer row R9:1, to which inputs DI8 to DI15 are connected. In vertical direction, four multiplexer rows R9:1 are connected in parallel to form a 8×4 block B8×4. In vertical direction as well as in horizontal direction, an amplifier is provided after each block for amplitude regeneration.

Figure 7:
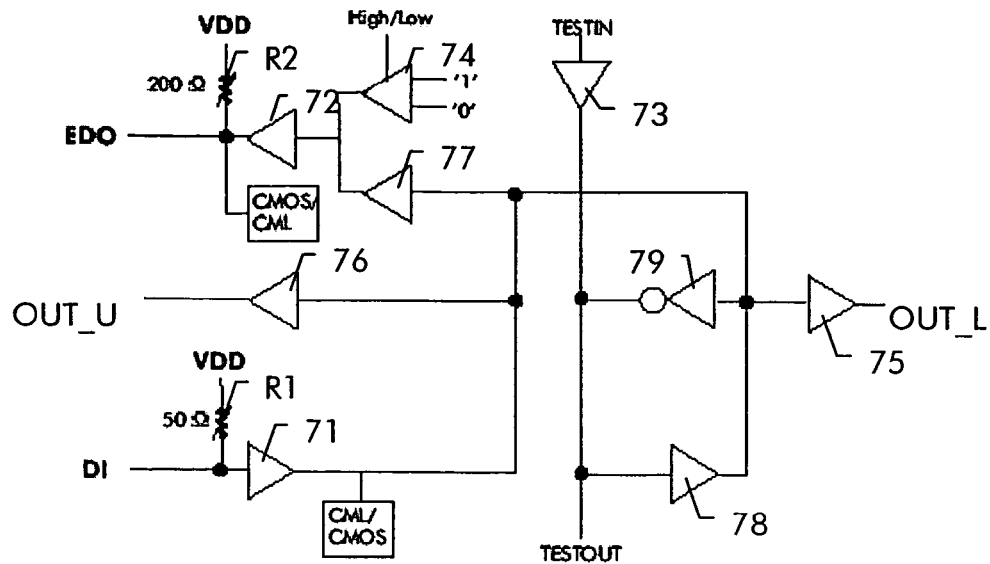
FIG. 7 shows a block diagram of an input port with extension output port.

Having described the matrix core above, the following contains a description of the input and output circuits of the switching matrix. FIG. 7 shows a block diagram of the input circuit with extension output. The circuit has an data input DI, a extension data output EDO, a test input TESTIN, a test output TESTOUT and two outputs OUT_U and OUT_L connected to the upper and lower matrix quadrants, respectively.

The data input DI is connected via termination resistor R1, which is 50Ω, to the voltage supply VDD, thus physically terminating the input line. The extension output line is terminated by resistor R2 being 200Ω.

Input signal DI is amplified by amplifier 71. The input DI can be connected to either of the outputs OUT_U or OUT_L via switched amplifiers 76 or 75, respectively, and to the extension data output EDO via switched amplifier 77 and output amplifier 72. Test input TESTIN is amplified by amplifier 78 and can be switched for test purposes to either of the outputs OUT_U, OUT_L, or EDO via switched amplifier 78 or looped back via inverted amplifier 79. Inverted amplifier 79 allows also to switch the data input DI to the test output TESTOUT.

The input port circuit further contains a high-low switch 74 that allows to switch a constant differential signal "0" or "1" logical level to the output pad. This can be used for the purpose of testing static output levels and to test their interchip connections (bond wires, printed circuits, etc.) and for low speed signaling on unused data links.

Signals at every broadband output can be monitored and read out via CML-to-CMOS converters connected to the control interface. Though this is a low-speed process, it allows to detect defects like short cuts or missing external line terminators.

Figure 8:
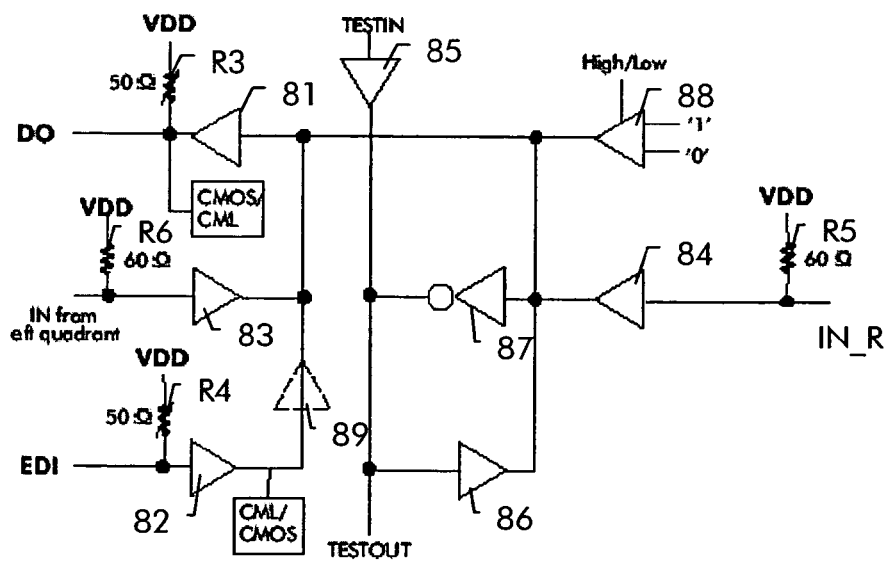
FIG. 8 shows a block diagram of an output port with extension input port.

FIG. 8 shows a block diagram of the output circuit with extension input. The circuit has an data output DO, a extension data input EDI, a test input TESTIN, a test output TESTOUT and two inputs IN_L and IN_R connected to the left and right matrix quadrants, respectively.

The data output DO is terminated by resistor R3 being 50Ω and the extension input line EDI is terminated by resistor R4 being 50Ω, as well. The signals coming from the left and right matrix quadrants are terminated by resistors R5 and R6, respectively, which are both 60Ω.

Data output DO is connected to an output amplifier 81, which acts as line driver for the output line. Extension data input EDI can be connected to data output DO via switched amplifier 82. The inputs IN_L and IN_R from the left and right matrix quadrants can be connected to the data output DO by switched amplifiers 83 and 84, respectively. The test output is fed via switched amplifier 85 to the test output and can be connected via amplifier 86 to data output DO or fed back via inverted amplifier 87 to create a test loop. An additional amplifier 89 draw with dotted lines is available only at output ports with odd number.

As in the input port circuit in FIG. 7, the output port circuit also contains a high-low switch 88.

In order to utilize chip surface as efficient as possible and minimize signals path length on the chip, two regular input ports and their adjoined extension output ports are combined to a double I/O port block.

It should be noted, that all high-speed connections are balanced signals. This is, however, not shown in the schematic FIGS. 7 and 8 for the sake of simplification.

Figure 9:
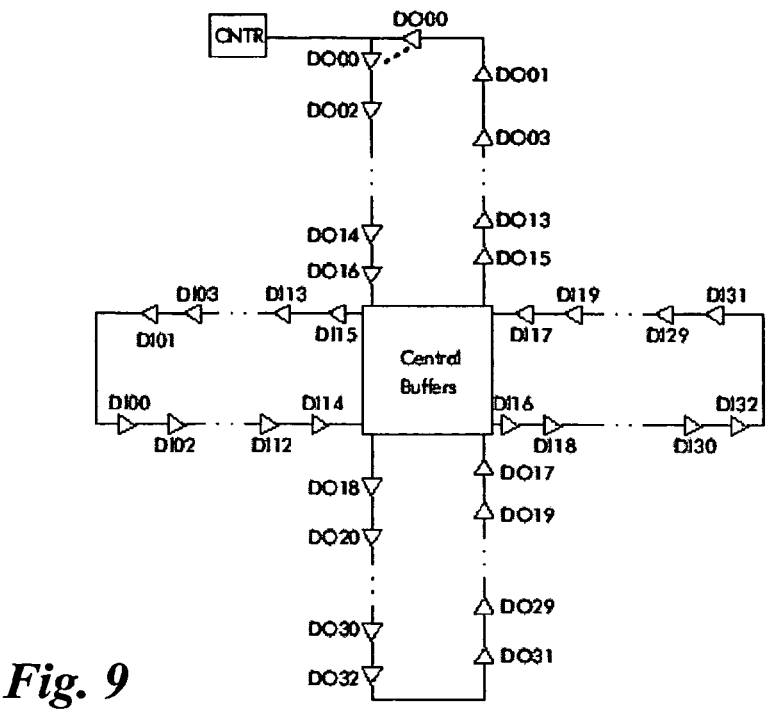
FIG. 9 shows a structural diagram of a test ring through the entire chip.

Test inputs and outputs of the input and output port circuits are connected in the way shown in FIG. 9 to allow to switch a single test ring through all input and output port circuits. In particular, test ports of the odd ports are connected in series and test ports of the even ports are connected. The amplifiers shown in FIG. 9 are the switched amplifiers at the corresponding test inputs of the ports, i.e., 73 and 85 in FIGS. 7 and 8. Each amplifier has to be enabled (powered) in order to let the signal pass.

Figure 10:
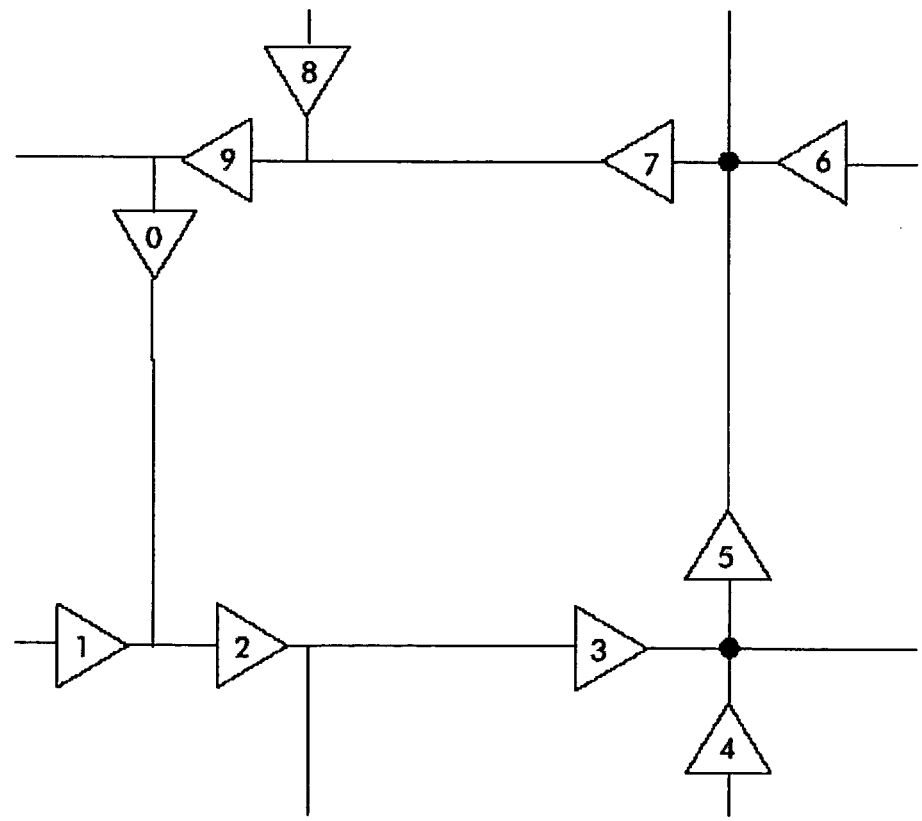
FIG. 10 shows the inner test ring.

As shown in FIG. 10, in the center, a ring of amplifiers 0-9 connects the four branches of the X-shaped I/O ports and allows to short the test ring by omitting one or more of the other branches. Amplifiers 0, 3, 5, and 7 allow to short the test loop, while the test loop leads via all four branches when these four amplifiers are switched off.

The test ring is a path going through all broadband input and output ports. The test ring can be entered at every broadband input and left at every broadband output port. As the signal is inverted when entering the test ring (see inverted amplifiers 79 and 87 in FIG. 7 and 8), the test ring can be used to set up a ring oscillator. The frequency with which the ring oscillator swings is a measure for the path lengths along the ring oscillator and thus a perfect tool to test the device. This allows testing on-chip data connections from any input to any output without the need of high speed data source at every input. Testing on-chip data connections can be done even without any high-speed source attached when the test ring is configuring as a ring oscillator and the oscillation signal is switched through the matrix core to any output.

The matrix chip additionally contains a frequency counter CTR (FIG. 9), which counts the number of rising edges of the signal being present on the test ring. The counter may be started and stopped by a certain control instruction via the control interface (not shown) and the counting result be read out. This allows to determine the data rate of the signal, if its static behavior is known. It will also be used for evaluating the frequency of the ring oscillator set-ups.

It is also possible to set up a ring oscillation inside a single regular output port. This oscillation will occur at about 4 GHz and can serve to generate an idle signal if an output is unused.

Figure 11:
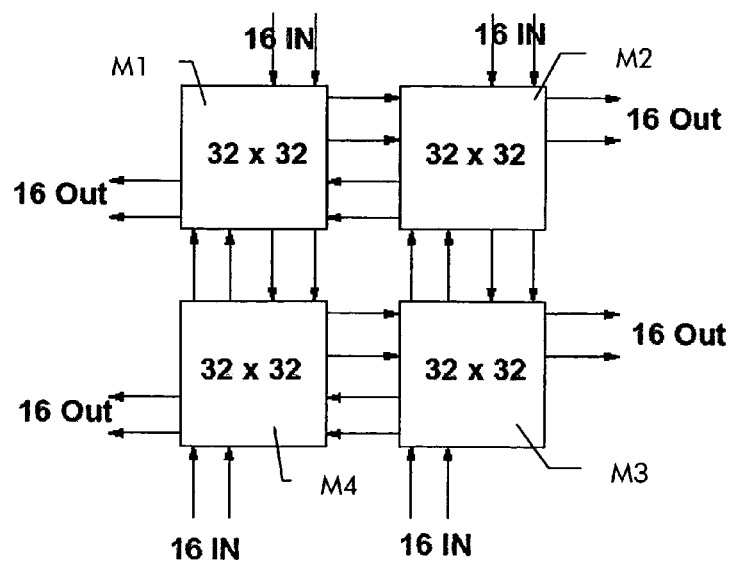
FIG. 11 shows four matrix chips cascaded to form a 64×64 compound switching matrix.

FIG. 11 shows four 32×32 matrix chips M1-M4 cascaded to form a 64×64 matrix. The 33th input and output ports of the four matrices are unused and serve for test purposes, only.

In order to form the compound matrix, extension outputs are connected to regular inputs of an adjacent matrix chip and regular outputs are connected to extension inputs of adjacent chips. In particular, the regular data inputs with even port number of chip M1 are connected to the extension data outputs with even number of chip M3. Conversely, the regular data inputs with odd port number of chip M3 are connected to the extension data outputs with odd port number of chip M1. Likewise, the regular data inputs with even port number of chip M2 are connected to the extension data outputs with even number of chip M4 and the regular data inputs with odd port number of chip M4 are connected to the extension data outputs with odd port number of chip M2.

Moreover, the extension data inputs with even port number of chip M1 are connected to the regular data outputs with even port number of chip M2 and the regular data outputs with odd port number of chip M1 are connected to the extension data inputs with odd port number of chip M2. Likewise, the extension data inputs with even port number of chip M3 are connected to the regular data outputs with even port number of chip M4 and the regular data outputs with odd port number of chip M3 are connected to the extension data inputs with odd port number of chip M4.

Regular data inputs with odd port number of matrix chips M1 and M3 and regular data inputs with even port number of matrix chips M2 and M4 are available as input ports of the compound 64×64 matrix. Conversely, regular data outputs with even port number of matrix chips M1 and M3 and regular data outputs with even port number of matrix chips M2 and M4 are available as output ports of the compound 64×64 matrix. Extension data outputs with even port number and extension data inputs with odd port number of chip M1, extension data outputs with even port number and extension data inputs with even port number of chip M2, extension data outputs with odd port number and extension data inputs with odd port number of chip M3, and extension data outputs with odd port number and extension data inputs with even port number of chip M4 are not used in this configuration.

Equally, 16 matrix chips can be cascaded according to the same rules to form a 128×128 matrix. Alternatively, a number of basic matrix chips can also be cascaded in the form of a Clos matrix to form a higher capacity compound switching matrix.

Having described the invention in a preferred embodiment, it would be apparent to those skilled in the art, that the invention is not restricted to implementation details and particular figures given in the embodiment. Conversely, those skilled in the art would appreciate that several changes, substitutions and alterations can be made without departing from the concepts and spirit of the invention.

What is claimed is:

1. An integrated electrical switching matrix chip, comprising:
   a plurality of input terminals,
   a plurality of output terminals, and
   a plurality of crosspoint switches, said crosspoint switches arranged in a switching matrix interconnecting said input terminals and said output terminals so that any one of said input terminals can be switched to any one of said output terminals via at least one of the crosspoint switches,
   wherein said input terminals and said output terminals are arranged on said chip in the shape of a cross dividing said matrix into four sectors, and
   wherein any input terminal can be connected to any output terminal via an electrical signal path passing through only one of said sectors.

2. The integrated electrical switching matrix chip according to claim 1, wherein said input terminals are arranged in a first row and said output terminals are arranged in a second row substantially perpendicular to said first row.

3. The integrated electrical switching matrix chip according to claim 1, wherein the number of crosspoint switches is equal to the product of the number of input terminals and the number of output terminals.

4. The integrated electrical switching matrix chip according to claim 1, further comprising:
   a plurality of extension output terminals, and
   a plurality of extension input terminals,
   wherein each extension input terminal is assigned to one of said output terminals and each extension output terminal is assigned to one of said input terminals, and each extension input terminal is disposed on the chip in the vicinity of its corresponding output terminal and each extension output terminal is disposed on the chip in the vicinity of its corresponding input terminal.

5. The integrated electrical switching matrix chip according to claim 4, wherein each extension output terminal is connected to its corresponding input terminal via a buffer amplifier and each extension input terminal is connected to its corresponding output terminal via an extension switch.

6. The integrated electrical switching matrix chip according to claim 1, further comprising at least one reference voltage generator disposed in the center of the cross.

7. The integrated electrical switching matrix chip according to claim 1, wherein the four sectors are quadrants.

8. The integrated electrical switching matrix chip according to claim 1, wherein said plurality of input terminals comprises N input terminals, said plurality of output terminals comprises M output terminals, and said plurality of crosspoint switches comprises N×M crosspoint switches.

9. The integrated electrical switching matrix chip according to claim 8, wherein said input terminals are arranged in a first row and said output terminals are arranged in a second row substantially perpendicular to said first row.

10. The integrated electrical switching matrix chip according to claim 8, further comprising:
    a plurality of extension output terminals, and
    a plurality of extension input terminals,
    wherein each extension input terminal is assigned to one of said output terminals and each extension output terminal is assigned to one of said input terminals, and each extension input terminal is disposed on the chip in the vicinity of its corresponding output terminal and each extension output terminal is disposed on the chip in the vicinity of its corresponding input terminal.

11. The integrated electrical switching matrix chip according to claim 10, wherein each of said extension output terminals is connected to its corresponding input terminal via a buffer amplifier and each extension input terminal is connected to its corresponding output terminal via an extension switch.

12. The integrated electrical switching matrix chip according to claim 6, wherein said plurality of input terminals comprises N input terminals, said plurality of output terminals comprises M output terminals, and said plurality of crosspoint switches comprises N×M crosspoint switches.

13. The integrated electrical switching matrix chip according to claim 8, wherein the four sectors are quadrants.

14. An integrated electrical switching matrix chip, comprising:
    a plurality of input terminals,
    a plurality of output terminals, and
    a plurality of crosspoint switches arranged in a switching matrix interconnecting said input terminals and said output terminals so that any one of said input terminals can be switched to any one of said output terminals via at least one of the crosspoint switches,
    wherein said input terminals and said output terminals are arranged on said chip in the shape of a cross dividing said matrix into four sectors, and
    wherein said input terminals and said output terminals comprise amplifiers arranged to connect said input terminals and said output terminals to a test ring when activated.

15. The integrated electrical switching matrix chip according to claim 14, wherein said plurality of input terminals comprises N input terminals, said plurality of output terminals comprises M output terminals, and said plurality of crosspoint switches comprises N×M crosspoint switches.

16. An integrated electrical switching matrix chip, comprising:
    a plurality of input terminals,
    a plurality of output terminals, and
    a plurality of crosspoint switches arranged in a switching matrix interconnecting said input terminals and said output terminals so that any one of said input terminals can be switched to any one of said output terminals via at least one of the crosspoint switches, wherein said input terminals and said output terminals are arranged on said chip in the shape of a cross dividing said matrix into four sectors, and wherein any input terminal can be connected to any output terminal via an electrical signal path passing through only one of said crosspoint switches.

17. The integrated electrical switching matrix chip according to claim 16, wherein said plurality of input terminals comprises N input terminals, said plurality of output terminals comprises M output terminals, and said plurality of crosspoint switches comprises N×M crosspoint switches.

18. An integrated electrical switching matrix chip, comprising:

a plurality of input terminals, a plurality of output terminals, and a plurality of crosspoint switches arranged in a switching matrix interconnecting said input terminals and said output terminals so that any one of said input terminals can be switched to any one of said output terminals via at least one of the crosspoint switches, wherein said input terminals and said output terminals are arranged on said chip in the shape of a cross dividing said matrix into four sectors, and said crosspoint switches are arranged in said sectors outside of said cross.

19. The integrated electrical switching matrix chip according to claim 18, wherein said plurality of input terminals comprises N input terminals, said plurality of output terminals comprises M output terminals, and said plurality of crosspoint switches comprises N×M crosspoint switches.

* * * * *